United States Patent
Rainer et al.

(10) Patent No.: US 11,502,597 B2
(45) Date of Patent: Nov. 15, 2022

(54) STARTUP OF A VOLTAGE CONVERTER

(71) Applicant: Infineon Technologies Austria AG, Villach (AT)

(72) Inventors: Christian Rainer, Magdalensberg (AT); Roberto Rizzolatti, Villach (AT)

(73) Assignee: Infineon Technologies Austria AG, Villach (AT)

(*) Notice: Subject to any disclaimer, the term of this patent is extended or adjusted under 35 U.S.C. 154(b) by 259 days.

(21) Appl. No.: 16/737,134

(22) Filed: Jan. 8, 2020

(65) Prior Publication Data
US 2021/0211040 A1 Jul. 8, 2021

(51) Int. Cl.
*H02M 1/36* (2007.01)
*G05B 9/02* (2006.01)
*H02M 3/335* (2006.01)

(52) U.S. Cl.
CPC .............. *H02M 1/36* (2013.01); *G05B 9/02* (2013.01); *H02M 3/33576* (2013.01)

(58) Field of Classification Search
CPC ............................................. H02M 3/07–078
See application file for complete search history.

(56) References Cited

U.S. PATENT DOCUMENTS

| 6,429,632 | B1 * | 8/2002 | Forbes | H02M 3/07 323/282 |
| 9,293,982 | B2 | 3/2016 | Maruyama | |
| 9,847,712 | B2 * | 12/2017 | Low | H02M 3/07 |
| 10,468,978 | B2 * | 11/2019 | Zhang | H02M 7/4837 |
| 2008/0013349 | A1 * | 1/2008 | Yanagida | H02M 3/073 363/60 |
| 2010/0060248 | A1 * | 3/2010 | Kao | H02M 1/36 323/280 |

(Continued)

FOREIGN PATENT DOCUMENTS

| EP | 3514932 A2 | 7/2019 |
| EP | 3514932 A3 | 7/2019 |
| WO | 2019176328 A1 | 9/2019 |

OTHER PUBLICATIONS

Jiang, et al. "Switch Tank Converters," date added to IEEE Xplore Apr. 19, 2018, Published in 2018 IEEE Applied Power Electronics Conference and Exposition (APEC), conference date Mar. 4-8, 2018, pp. 1-15, Google Inc. 1220 N. Mathilda Ave, Sunnyvale, CA 94089, † DPIA—University of Udine Via delle Scienze 208, 33100 Udine, Italy.

(Continued)

*Primary Examiner* — Peter M Novak
(74) *Attorney, Agent, or Firm* — Armis IP Law, LLC

(57) ABSTRACT

A power supply system comprises: a switched-capacitor converter, a monitor, and a controller. The switched-capacitor converter includes an input node to receive an input voltage and an output voltage to output an output voltage. Switching of multiple switches in the switched-capacitor converter converts the input voltage into the output voltage. As its name suggests, the monitor monitors a magnitude of the output voltage. The controller receives input indicating the magnitude of the output voltage. Depending on the magnitude of the output voltage, the controller controls states of the multiple switches during startup of the switched-capacitor converter.

30 Claims, 13 Drawing Sheets

(56) References Cited

U.S. PATENT DOCUMENTS

| | | | | |
|---|---|---|---|---|
| 2011/0140679 A1* | 6/2011 | Xu | ........................ | H02M 3/158 |
| | | | | 323/290 |
| 2012/0176816 A1* | 7/2012 | Seel | ........................ | H02M 1/36 |
| | | | | 363/21.01 |
| 2014/0268936 A1* | 9/2014 | Lu | ........................... | H02M 1/36 |
| | | | | 363/49 |
| 2018/0054133 A1* | 2/2018 | Moon | ..................... | H02M 1/32 |
| 2019/0115834 A1* | 4/2019 | Hu | ......................... | H02M 3/07 |
| 2021/0203222 A1* | 7/2021 | Ilic | ........................ | H02M 3/158 |

OTHER PUBLICATIONS

EP Search Report, EP 21150469.1, dated May 27, 2021, pp. 1-8.

\* cited by examiner

STARTUP OF A VOLTAGE CONVERTER

BACKGROUND

As its name suggests, a conventional switched-capacitor DC-DC converter converts a received DC input voltage into a DC output voltage.

In one conventional application, the input voltage to the conventional switched-capacitor converter falls in a range between 40 VDC to 60 VDC. In such an instance, switches in the switched-capacitor converter are controlled to transfer charge stored in respective capacitors, resulting in conversion of the input voltage such as a 48 VDC to an output voltage such as 12 VDC for a so-called conventional 4:1 switched-capacitor converter. In other words, a conventional switched-capacitor converter can be configured to convert a 48 VDC voltage into a 12 VDC voltage.

Conventional techniques further include implementing a so-called hot swap circuit to accommodate startup of a switched-capacitor converter. For example, instead of the switched-capacitor converter directly receiving the input voltage, a hot swap circuit receives the input voltage and conditions it (such as delays and slow ramps the input voltage) before passing it on to the switched-capacitor converter for conversion. Inclusion of a hot swap circuit limits an in-rush of current to the switched-capacitor converter.

BRIEF DESCRIPTION

This disclosure includes the observation that conventional implementation of a hot swap circuit (or the like) is undesirable for multiple reasons. For example, implementing a hot swap circuit increases a footprint and cost of a respective power supply. Additionally, the hot swap circuit consumes power.

Embodiments herein provide improved power generation. For example, according to one embodiment, an apparatus (such as a power supply) comprises: a switched-capacitor converter, a monitor, and a controller. The switched-capacitor converter includes an input node to receive an input voltage and an output node to output an output voltage. Switching of multiple switches in the switched-capacitor converter converts the input voltage into the output voltage. As its name suggests, the monitor monitors a magnitude of the output voltage during startup. The controller receives input indicating the magnitude of the output voltage. Depending on the magnitude of the output voltage, the controller controls states of the multiple switches during startup of the switched-capacitor converter.

In accordance with further embodiments, controlling states of the multiple switches of the switched-capacitor converter during the startup limits current inputted to the input node of the switched-capacitor converter from the input voltage. In one embodiment, limiting current prevents the input voltage from dropping as a result of too much current draw. In yet further example embodiments, the controller limits current inputted to the switched-capacitor converter from the input voltage depending on an effective capacitance of the switched-capacitor converter from a perspective of the input node.

In yet further example embodiments, the controller ramps a pulse width of control signals applied to the switches during the startup of the switched-capacitor converter. For example, in one embodiment, during the startup of the switched-capacitor converter, the controller increases pulse widths of respective control signals applied to the multiple switches. If desired, the controller increases the pulse widths from an initial value to a target value during the startup.

In still further example embodiments, during the startup of the switched-capacitor converter, the controller decreases (such as ramps down) a switching frequency of the generated control signals applied to the multiple switches. This results in a period of the control signals increasing over time. If desired, the controller decreases the switching frequency from an initial switching frequency value to a target switching frequency value during the startup.

Further embodiments herein include, during the startup of the switched-capacitor converter, via the controller: i) increasing a pulse width (a.k.a., Ton time) of control signals applied to the multiple switches, and ii) decreasing a switching frequency of control signals applied to the multiple switches. In one embodiment, the controller simultaneously increases the pulse width and decreases the switching frequency one cycle after another.

The controller can be configured to control the multiple switches during startup based on any suitable power supply parameters. For example, in one embodiment, the controller controls switching of the multiple switches based on one or more parameters such as a magnitude of the input voltage, a magnitude of the output voltage, etc.

In accordance with further embodiments, the controller controls the multiple switches in a non-zero voltage switching mode during the startup such as when the output voltage is below a threshold value. The switched-capacitor converter as described herein controls the multiple switches in a zero voltage switching mode after the startup of the switched-capacitor converter.

In one embodiment, the controller implements hard-switching during the startup mode. Note that during a start-up, the hard-switching behavior (i.e., non-zero voltage switching mode) occurs because of higher switching frequency operation (not enough energy to charge and discharge the parasitic capacitance of the FETs). In general this behavior is a consequence of the start-up strategy, which is a consequence of increasing the switching losses during start-up, but which does not influence the nominal operation (zero voltage switching such as when the voltage is above a threshold value).

In yet further example embodiments, a duration of the startup mode is proportional to a magnitude of capacitance associated with the switched-capacitor converter. For example, the greater the capacitance associated with the switched-capacitor converter, the longer the duration of operating the switched-capacitor converter in the startup mode.

Yet further embodiments herein include, via the controller, implementing multi-mode operation (such as including at least a first mode and a second mode) of the switched-capacitor converter during startup of the switched-capacitor converter in which the output voltage is ramped up such as to a target output voltage. In such an instance, the controller is operative to: i) in the first mode, such as first conditions in which the output voltage is detected as being below a threshold value, produce control signals driving the multiple switches, the control signals being of a selected fixed pulse width and selected fixed switching frequency; and ii) in the second mode, such as during second conditions in which the output voltage is detected as being above the threshold value, ramp up a magnitude of the pulse width of the control signals driving the multiple switches, and ramp down a magnitude of the switching frequency of the control signals driving the multiple switches.

Note that the switched-capacitor converter as described herein can be configured in any suitable manner to convert the input voltage into the output voltage. For example, in one embodiment, the switched-capacitor converter is a so-called hybrid switched-capacitor converter including a transformer such as a multi-tapped autotransformer. The multi-tapped transformer includes a first winding (such as a first input winding of an input winding group) and a second winding (such as a second input winding of the input winding group); multiple capacitors of the switched-capacitor converter are controllably switched in circuit paths including the first winding and the second winding. In such an example embodiment, the switched-capacitor converter further includes: an output stage coupled to receive energy from a combination of the first winding and the second winding of the multi-tapped autotransformer. The output stage produces the output voltage that powers a load.

In yet further example embodiments, the hybrid switched-capacitor converter includes a first winding and a second winding; the controller controls the multiple switches to convey energy provided from the input voltage to the first winding and the second winding. In one embodiment, the switched-capacitor converter includes multiple resonant circuit paths that convey energy from the input voltage to the first winding and the second winding.

Note that embodiments herein are useful over conventional techniques. For example, in contrast to conventional techniques, the novel power supply as described herein reduces a respective circuit board footprint of a power supply, reduces a cost of the power supply, reduces a number of needed components to implement the switched-capacitor converter, and provides faster startup.

These and other more specific embodiments are disclosed in more detail below.

Note that any of the resources as discussed herein can include one or more computerized devices, apparatus, hardware, etc., that execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to generate an output voltage to power a load. The instructions, when executed by computer processor hardware, cause the computer processor hardware (such as one or more co-located or disparately located processor devices or hardware) to: receive an input voltage at an input node of a switched-capacitor converter, switching of multiple switches in the switched-capacitor converter converting the input voltage into an output voltage; monitor a magnitude of the output voltage; and control states of the multiple switches depending on a magnitude of the output voltage during startup of the switched-capacitor converter.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling operation of a switched-capacitor converter, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
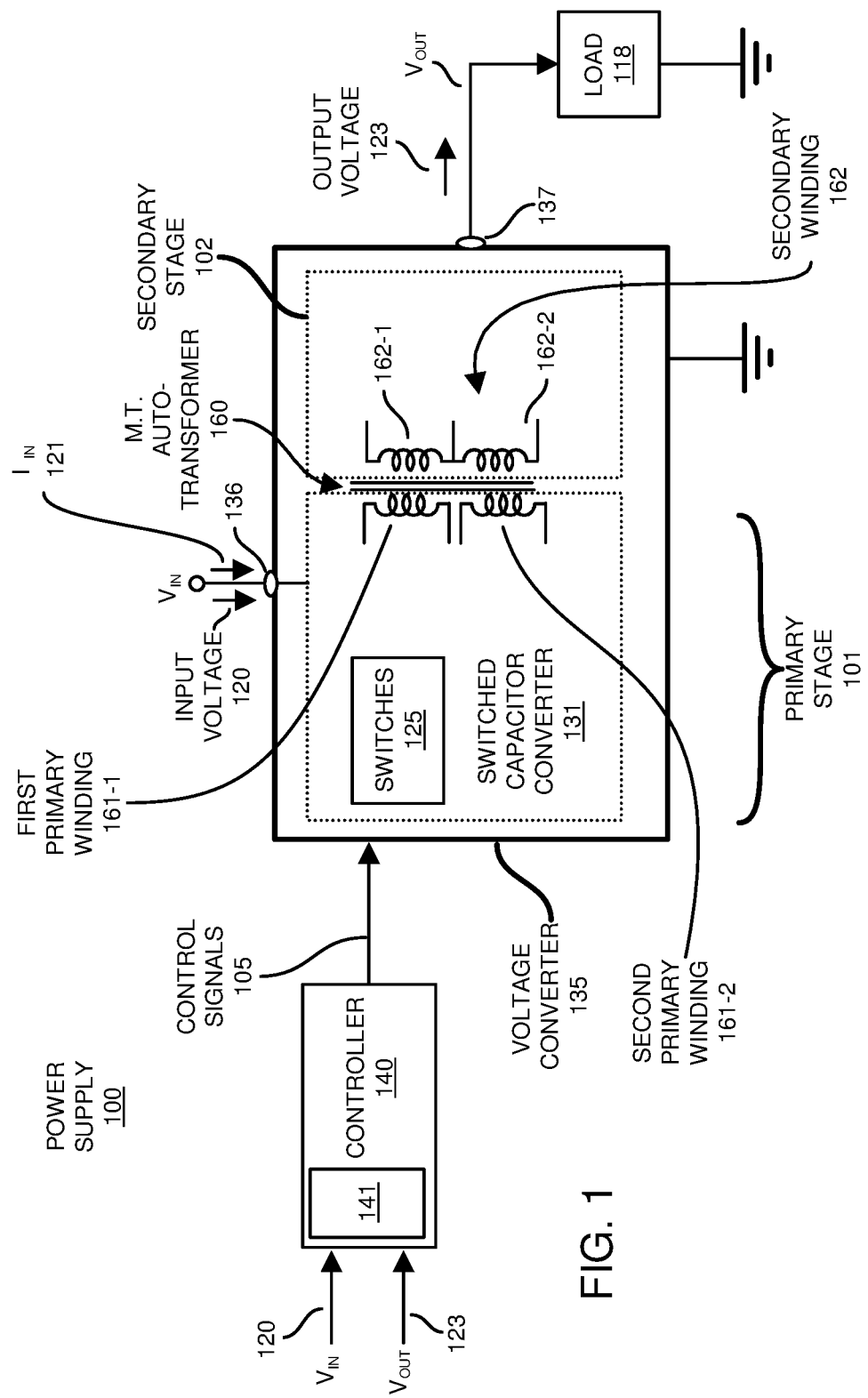
FIG. 1 is an example diagram illustrating a power supply including a switched-capacitor converter and corresponding autotransformer according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, as further discussed herein, an apparatus such as power supply system comprises: a switched-capacitor converter, a monitor, and a controller. The switched-capacitor converter includes an input node to receive an input voltage and an output node to output an output voltage. Switching of multiple switches in the switched-capacitor converter converts the input voltage into the output voltage. As its name suggests, a monitor associated with the controller monitors the output voltage. Thus, the controller receives input indicating a magnitude of the output voltage. Depending on the magnitude of the output voltage, the controller controls states of the multiple switches during startup of the switched-capacitor converter. In one embodiment, the controlled states limit an amount of current inputted to the input node of the switched-capacitor converter.

Now, more specifically, FIG. 1 is an example diagram illustrating a power supply including a switched-capacitor converter and corresponding transformer according to embodiments herein.

As shown in this example embodiment, power supply 100 (such as an apparatus, electronic device, etc.) includes a controller 140 and voltage converter 135. The voltage converter 135 includes a primary stage 101 and a secondary stage 102.

Controller 140 includes monitor 141. Monitor 141 associated with the controller 140 can be disposed inside or outside of the controller 140.

Primary stage 101 includes a switched-capacitor converter 131 comprising switches 125, first winding 161-1 such as a first input winding, and second winding 161-2 such as a second input winding of multi-tapped autotransformer 160. Note that the multi-tapped autotransformer 160 can be any suitable transformer device. As previously discussed, the switched-capacitor converter can be any type of voltage converter such as a so-called hybrid switched-capacitor converter including a transformer such as a multi-tapped autotransformer.

Secondary stage 102 includes windings 162 (such as output windings) of a multi-tapped autotransformer 160 and related circuitry to generate output voltage 123 (Vout, such as a generally a DC voltage). In one embodiment, windings 162 comprise first winding 162-1 (such as a first output winding) and second winding 162-2 (such as a second output winding). In one embodiment, winding 162-1 and winding 162-2 represent an output winding group.

Thus, in one embodiment, secondary stage 102 includes windings 162 (such as an output winding group) of multi-tapped autotransformer 160 and related circuitry to generate output voltage 123 (Vout, such as a generally a DC voltage). In one embodiment, output windings 162 comprises first output winding 162-1 and second output winding 162-2 (i.e. forming an output winding group).

Note that each of the resources as described herein can be instantiated in a suitable manner. For example, each of the controller 140, switched-capacitor converter 131, multi-tapped autotransformer 160, etc., can be instantiated as or include hardware (such as circuitry), software (executable instructions), or a combination of hardware and software resources.

During operation, controller 140 produces control signals 105 (such as one or more pulse width modulation signals) that control states of respective control switches 125 in switched-capacitor converter 131.

As further shown, the switched-capacitor converter 131 receives the input voltage 120 (Vin, such as a DC input voltage) supplied by source Vin to the switched-capacitor converter 131. As previously discussed, the multi-tapped autotransformer 160 includes a first winding 161-1 and a second winding 162-1. In one embodiment, the windings 161 are at least inductively coupled to the winding 162. In accordance with further embodiments, the windings 161 are connected in series with the windings 162.

As further discussed herein, controller 140 of the power supply 100 controllably switches multiple capacitors and corresponding resonant circuit paths including the windings 161 of multi-tapped autotransformer 160 to convey energy from the input voltage (Vin) through the winding 161 to the winding 162 to produce the output voltage 123.

Further embodiments herein include operating the switched-capacitor converter 131 in a so-called soft start mode (startup). In such an instance, the switched-capacitor converter 131 receives an input voltage 120 (Vin) from an input node 136 of the switched-capacitor converter 131. Via control of switches 125 (such as Q1, Q2, Q3, Q4, Q5, Q6 as further discussed below) in the switched-capacitor converter 131, the controller 140 converts the input voltage 121 into an output voltage 123. In one embodiment, the monitor 141 of controller 140 monitors a magnitude of the output voltage 123. Depending on a magnitude of the output voltage 123 and potentially a magnitude of the input voltage 120 as well, the controller 140 controls states of the multiple switches 125 during startup of the switched-capacitor converter 131 preventing an undesirable in-rush of current 121 into node 136. In other words, during startup, the controller 140 controls a rate at which current 121 is inputted to the switched-capacitor converter 131 to charge respective capacitors.

Figure 2:
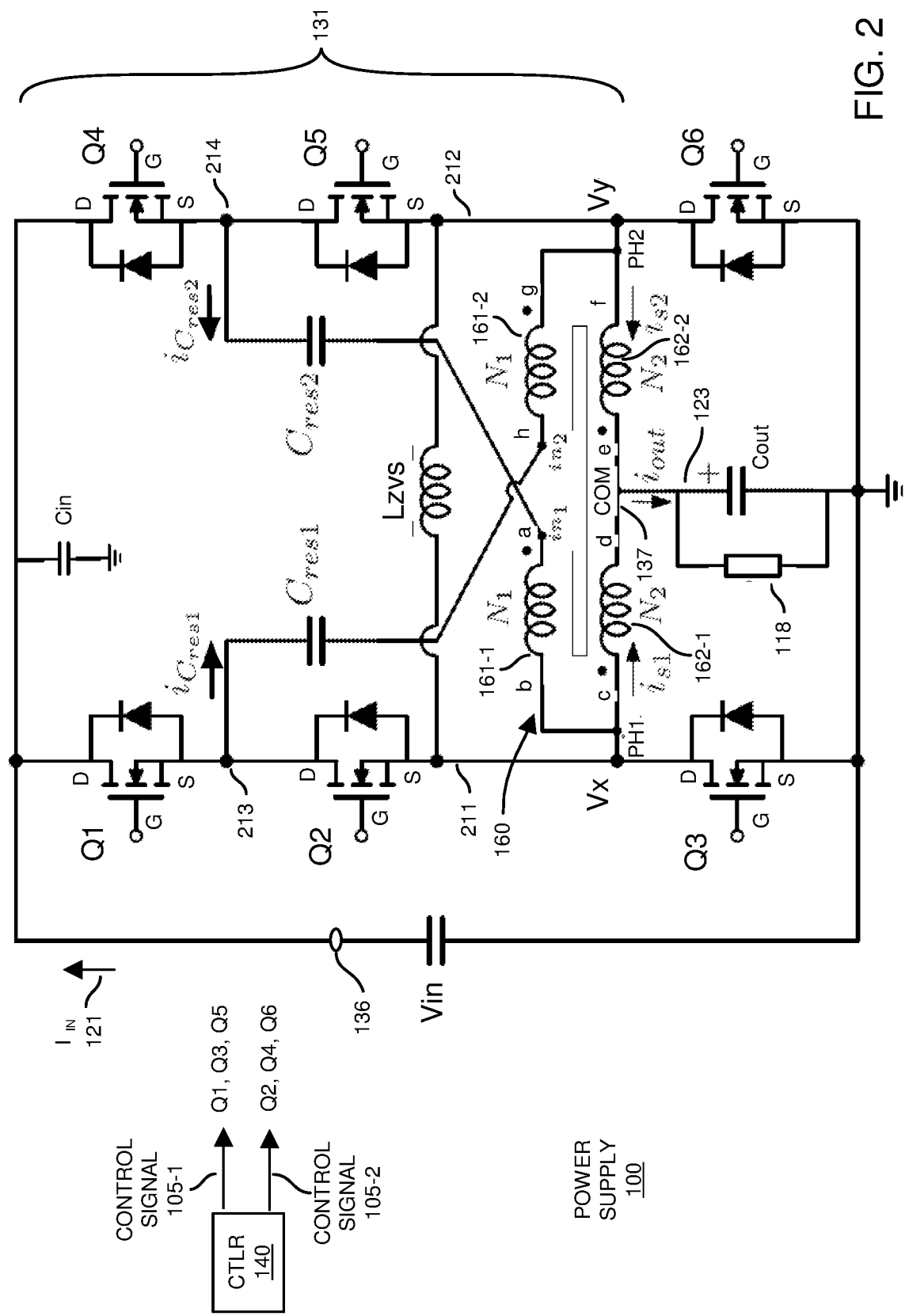
FIG. 2 is an example diagram illustrating a controller and a more detailed rendition of a power supply including a switched-capacitor converter and a multi-tapped autotransformer according to embodiments herein.

FIG. 2 is an example diagram illustrating a switched-capacitor converter according to embodiments herein.

As shown, the power supply 100 includes voltage source Vin, switched-capacitor converter 131, and multi-tapped autotransformer 160.

The switched-capacitor converter 131 (apparatus such as hardware, circuitry, etc.) includes multiple switches Q1, Q2, Q3, Q4, Q5, and Q6 (such as field effect transistors or any other suitable type of switch). Additionally, the switched-capacitor converter 150 includes multiple circuit components including inductor Lzvs, capacitor Cres1, and capacitor Cres2.

Further in this example embodiment, the multi-tapped autotransformer 160 includes winding 161-1 (such as N1 turns), winding 161-2 (such as N1 turns), winding 162-1 (such as N2 turns), and winding 162-2 (such as N2 turns). The number of windings (N1, N2, etc.) associated with the winding 161 and/or the winding 162 can be any suitable value and vary depending on the embodiment.

In one embodiment, a combination of the windings 161 and windings 162 of multi-tapped autotransformer 160 are connected in series. For example, winding 161-1 is connected in series with winding 162-1; winding 162-1 is connected in series with winding 162-2; winding 162-2 is connected in series with winding 161-2.

In accordance with further embodiments, the winding 162 (such as a tapped secondary winding, or multiple secondary windings connected in series) is inductively coupled to the first winding 161-1 and second winding 161-2. In other words, as shown, the first winding 161-1, the second winding 161-2, and the winding(s) 162 are magnetically coupled to each other. If desired, the winding 162 can be a center tapped winding facilitating generation of the output voltage 123 from a respective output of the center-tapped winding.

Further in this example embodiment, the drain node (D) of switch Q1 and the drain node (D) of switch Q4 are connected to the input voltage source Vin.

Further, the source node (S) of the switch Q1 is coupled to the drain node (D) of the switch Q2 (node 213). The source node (S) of the switch Q4 is coupled to the drain node (D) of the switch Q5 (node 214). The source node (S) of the switch Q2 is coupled to node 211. The source node (S) of the switch Q5 is coupled to node 212.

Capacitor Cres1 is connected between node 213 and a respective node of winding 161-2. Capacitor Cres2 is connected between node 214 and a respective node of winding 161-1.

Inductor Lzvs is coupled in parallel to winding 161 and is disposed between node 211 and 212.

The drain (D) of switch Q3 is connected to node 211; the source (S) of switch Q3 is connected to ground. The drain (D) of switch Q6 is connected to node 212; the source (S) of switch Q6 is connected to ground.

The center tap (common node 137) of the winding 162 outputs current Iout and corresponding output voltage 123 to drive load 118 (a.k.a., Ro). The output capacitor Cout is connected between node 137 and ground. The input capacitor Cin is coupled between the node 136 and ground.

In one embodiment, the magnitude of the output voltage 123 is Vin/8. Thus, if Vin=48 VDC, the magnitude of the output voltage 123 is 6 volts. However, as discussed herein, settings of components in the power supply 100 can be adjusted to produce an output voltage 123 (Vout) of any suitable value. In general the output voltage 123, Vout=Vin*(N2/(2*(2N2+N1))), where N1=the number of turns on the windings 161 and N2 is the number of turns on each of the windings 162. In one embodiment, each of the windings is a tapped winding (see FIG. 10 as an example). In accordance with further embodiments, note that the windings 161 are considered to be primary windings because they are associated with the primary stage 101; the windings 161 are considered to secondary windings because they are associated with the secondary stage 102.

In one embodiment, N1 is defined as the turns of each of windings 161 whilst N2 is defined as the turns of each of windings 162; in which case Vout=Vin*N2/(2*(2*N2+N1)).

As further shown, during operation, the controller 110 produces control signals 105-1 and 105-2.

Further in this example embodiment, control signal 105-1 generated by the controller 140 drives gates (G) of respective switches Q1, Q3, and Q5. Accordingly, control signal 105-1 controls a state of each of the switches Q1, Q3, and Q5.

Control signal 105-1 drives respective gates (G) of switches Q1, Q3, and Q5. Accordingly, control signal 105-2 controls a state of each of the switches Q2, Q4, and Q6.

Note that each of the switches as described herein can be any suitable devices such as (Metal Oxide Semiconductor) field effect transistors, bipolar junction transistors, etc.

The settings of capacitors Cres1 and Cres2 can be any suitable value. In one embodiment, the voltage converter 135 as described herein provides better performance when Cres1=Cres2, and works well even if Cres1≠Cres2. The inductor Lzvs can be any suitable value.

With further reference to FIG. 2, in one embodiment, additional inductance (such as inductor Lzvs) in parallel with the multi-tapped autotransformer 160 is optionally present to achieve zero voltage switching (ZVS) for one or more switches Q1-Q6. As further discussed below, the Lzvs inductance alternatively can be integrated in the multi-tapped autotransformer 161 (such as with gaps in the respective core or using core with lower permeability).

As previously discussed, switches in power supply 100 are divided into two switch groups: the first switch group including switches Q1, Q3, and Q5 controlled by respective control signal 105-1, and a second switch group including switches Q2, Q4, and Q6, controlled by respective control signal 105-2, which is generally a 180 degrees phase shift with respect to timing of control signal 105-1.

In one embodiment, subsequent to startup, the pulse width modulation of control signals 105 is approximately 50% to obtain the minimum RMS current. However, during startup, the pulse width modulation of control signals 105 is substantially less than 50% to limit in-rush current supplied by voltage 120.

In yet further example embodiments, the magnitude of the output voltage 123 depends on the turns (# of windings ratio N1/N2 of the primary winding to the secondary winding). In one embodiment, the switching frequency does not directly change the magnitude of the output voltage, but in general is changing it because the losses are increasing or decreasing based on the difference between Fres and Fsw, where Fres is the resonant frequency of the tank formed by Cres1 or Cres2 and the leakage of the multi-tapped autotransformer when Cres1=Cres2.

Embodiments herein include taking advantage of the leakage inductance, Lk, of the multi-tapped autotransformer 160 to (soft) charge the capacitors Cres1 and Cres2 during different control cycles. For example, in one embodiment, the capacitors Cres1 and Cres2 function as flying capacitors, enabling use of lower voltage field effect transistors at the primary side (switched-capacitor converter 131) in comparison to a classic LLC topology.

Note that a further benefit of the switched-capacitor converter 131 as described herein is the symmetric behavior of such a circuit. For example, as further discussed herein, via the implementation of power supply 100: i) the switched-capacitor converter 131 is powered almost continuously from the input supply Vin at different times in a respective control cycle, reducing the input current ripple as compared to other technologies, ii) in the equivalent resonant tank switched circuit paths of the switched-capacitor converter (such as first resonant circuit path including capacitor Cres1 and winding 161-2 and second resonant circuit path including capacitor Cres2 and winding 161-1), both resonant caps are resonating with the leakage inductance Lk of the multi-tapped autotransformer.

In one embodiment, if Cres1 Cres2 the resonant transitions are unbalanced, which actually is not an issue for operation. In general, if the difference is the maximum difference between Cres1 and Cres2 based on the tolerance (i.e. ±10%±20%), the converter is still running with high efficiency. In such an instance the converter is still working well because of ZVS operation.

Note further that one enabler of high efficiency and high-power density of the proposed power supply 100 is the ability to implement lower voltage rating field effect transistors and the implementation of Class II ceramic capacitors (such as capacitors Cres1 and Cres2), which inherently offer high capacitance density.

Moreover, as previously discussed, the additional inductor, Lzvs, provides the inductive energy to ensure ZVS transition for all field effect transistors in the switched-capacitor converter 131 such as during all switching conditions. For example, energy stored in the inductor Lzvs supplies charge to parasitic capacitors of the respective switches during dead times when switches Q1-Q6 are OFF.

Note that the proposed start-up procedure as described herein can be configured to include a way to limit the inrush current 121 (a.k.a., Iin) by limiting the conduction (switch ON time) time associated with switches 125 during a respective start-up procedure.

For example, the reduction of the inrushing current 121 is achieved by reducing the on-time duration, of both powering phases of the switched-capacitor converter 131 as shown in FIG. 2 (i.e., when switches Q1, Q3 and Q5 are ON or when switches Q2, Q4 and Q6 are ON), during start-up.

During the ON-time phase, the magnitude of inrush current 121 spikes depends on the actual parameters of the converter 131, the input voltage 120, and the actual energy stored in the capacitance of the converter (such as combined capacitance such as associated with capacitor Cin, capacitor Cres1, capacitor Cres2, and capacitor Cout). In this way, the reduction of the switch ON-times as further discussed herein results in higher switching frequency operation during start-up procedure if a small dead-time is implemented between activating a first set of switches Q1, Q3 and Q5 (via control signal 105-1) and activating a second set of switches Q2, Q4 and Q6 (via control signal 105-2).

As previously discussed, note again that switched-capacitor converter start-up procedure as described herein does not need any additional circuitry necessary to start up the converter safely.

In one embodiment, the switches Q1, Q2, Q4, and Q5 are exposed to higher voltage than when a conventional hot swap circuit conditions the input voltage into the switched-capacitor converter 131. If desired, the robustness (via higher voltage switches) of the switches can be increased via use of higher voltage transistors to withstand high drain to source voltages without being damaged. In one embodiment, the switches Q1, Q2, Q4, and Q5 withstand voltages of 80 volts, although the switches can be configured to support any suitable voltage class depending on a magnitude of the input voltage.

Figure 3:
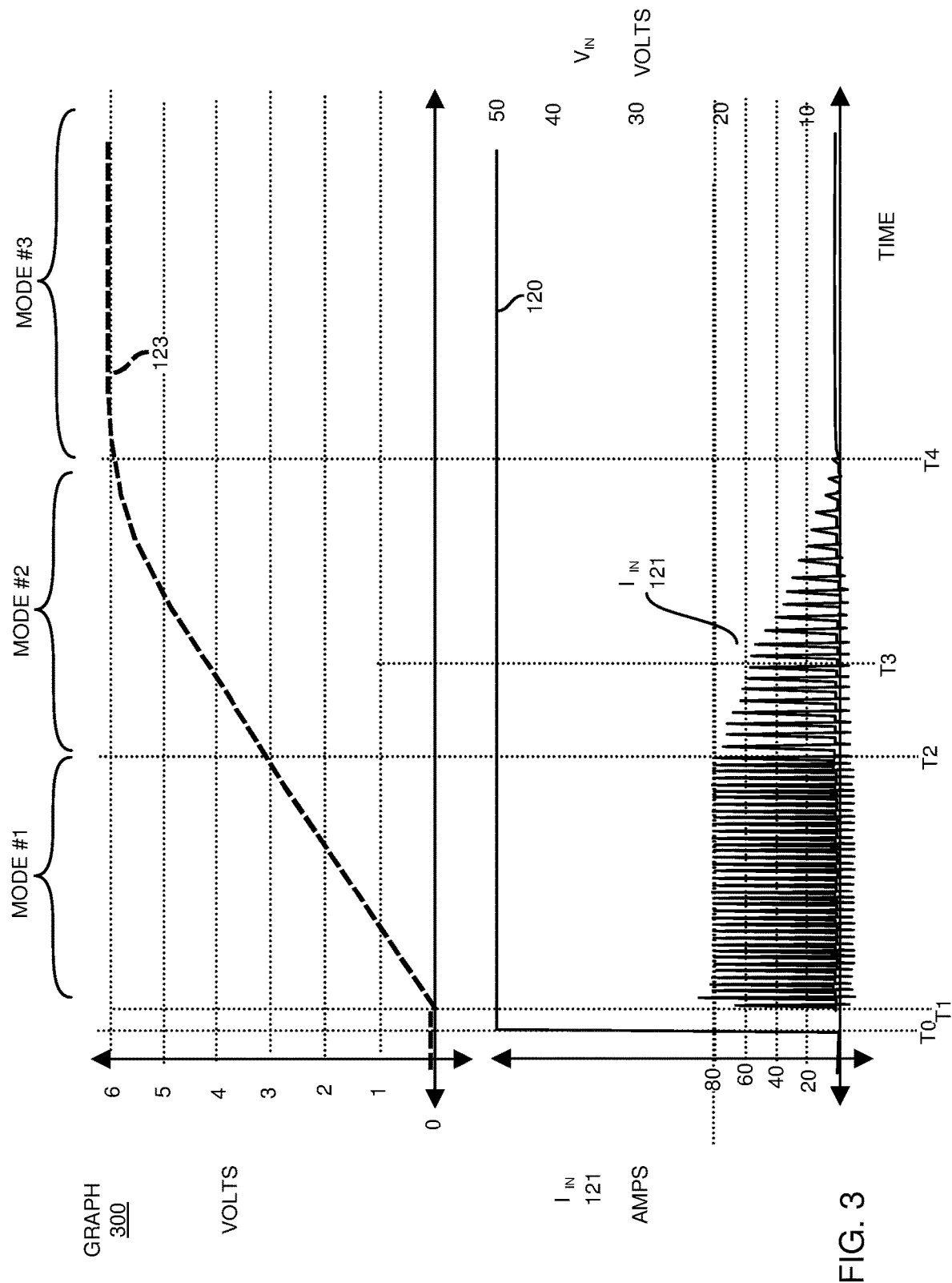
FIG. 3 is an example diagram illustrating limiting an in-rush of current to a switched-capacitor converter and corresponding ramping of an output voltage according to embodiments herein.

FIG. 3 is an example diagram illustrating limiting an in-rush of current to a switched-capacitor converter and corresponding ramping of an output voltage according to embodiments herein.

As previously discussed, the controller 140 produces control signals 105-1 and 105-2 to control states of the multiple switches 125 (such as switches Q1-Q6) of the switched-capacitor converter 131 to convert the input voltage 120 into the output voltage 123.

During the startup mode, such as between time T0 and time T4 in graph 300 of FIG. 3, the controller limits current 121 inputted to the input node 136 of the switched-capacitor converter 131 from the input voltage 120. In one embodiment, the controller 140 limits current inputted to the switched-capacitor converter 131 from the input voltage 120 based at least in part depending on an effective capacitance of the switched-capacitor converter 131 from a perspective of the input node 136.

In general a switching-capacitor converter or a Hybrid Switched-Capacitor converter (HSC), for start-up parameters purpose can be simplified as in the power supply 100 of FIG. 2. In one embodiment, the switched-capacitor converter 131 can be viewed as an equivalent circuit including multiple components (including resistor Request, inductor Leq, and capacitor Ceq) connected in series between the input voltage 120 and ground reference. In such an instance:

Resistor R_eq is the equivalent resistance from the input node 136 receiving input current 121 and depends on the switches 125 in the switched-capacitor converter 131, resistance associated with the autotransformer 160, and resistance from the PCB (Printed Circuit Board) traces.

Inductor L_eq, is parasitic inductance from the input node 136 and in a Hybrid Switched capacitor converter 131 mainly depends on the leakage autotransformer inductance.

Capacitor C_eq, is the main parameter and is defining the actual inrushing current experienced by the hot-swap MOSFET, this comprises all the capacitance of the converter (Input capacitance connected to node 2, resonant capacitance and output capacitance). By considering as input capacitance of the switched-capacitor converter 131, as resonant capacitances C_res1=C_res2=C_res and as output capacitance C_out, the following equation is defining the actual equivalent capacitance C_eq seen by the input voltage at input node 136 (i.e. useful do define the timing of the proposed soft-start control method for Hybrid Switches Capacitor converter):

$$C\_eq = C\_in + C\_res/2 + C\_out*(1/(4+2N\_1/N\_2))$$

This equation is valid for the switched-capacitor converter 131 here presented as test case but actually similar equivalent equation may be defined for any Hybrid Switches Capacitor converter.

As shown, at or around time T0 in graph 300, the input voltage 120 raises to a voltage such as 50 VDC or other suitable value. After detecting that the input voltage 120 raises above a threshold value such as 40 VDC or other suitable value, the controller 140 initiates startup of the switched-capacitor converter 131 after a short delay in a manner as described herein.

More specifically, after the short delay, such as at or around time T1, the controller 140 controls states of switches Q1-Q6 in an appropriate manner to convert the input voltage 120 into the output voltage 123.

For example, during mode #1, between time T1 and time T2, the controller 140 activates operation of the switches Q1-Q6 for shorter than normal duration switch-ON times. As previously discussed, the reduced ON time of switches (as opposed to applying maximum switch ON times during mode #1) limits the in-rush of current 121 that charges the capacitors (capacitance) associated with the switched-capacitor converter 131.

In one nonlimiting example embodiment, during mode #1, the controller 140 operates the switches in the switched-capacitor converter 131 at a fixed frequency or substantially fixed frequency (such as within 10% of a chosen value) while the ON time of respective switches is set to a fixed or substantially fixed duration of time (such as within 10% of a chosen value). As shown, operation of the switches in mode #1 limits spiking of current 121 to 80 Amperes. Further details of mode #1 control are discussed below.

During mode #2, between time T2 and time T4, the controller 140 continues to limit the inrush of current 121 into the switched-capacitor converter 131, however, to a lesser and varying degree with respect to mode #1. More specifically, during mode #2, the controller 140 adjusts one or more parameters associated with the controls signals 105 such as pulse widths (ON-time durations) and frequency between time T2 and time T4 to limit the in-rush current 121.

In one nonlimiting example embodiment, during mode #2, the controller 140 increases (such as ramps up) a magnitude of the ON-time durations of control signals 105 driving switches Q1-Q6. Additionally, or alternatively, during mode #2, the controller 140 ramps down a switching frequency associated with controls signals 105, resulting in wider pulses or longer periods.

Thus, as shown in FIG. 3, the period of input current 121 pulses (such as spikes to charge capacitance of the switched-capacitor converter 131) increase in magnitude between time T2 and time T4. Details of parameter adjustment are further shown below.

Figure 4:
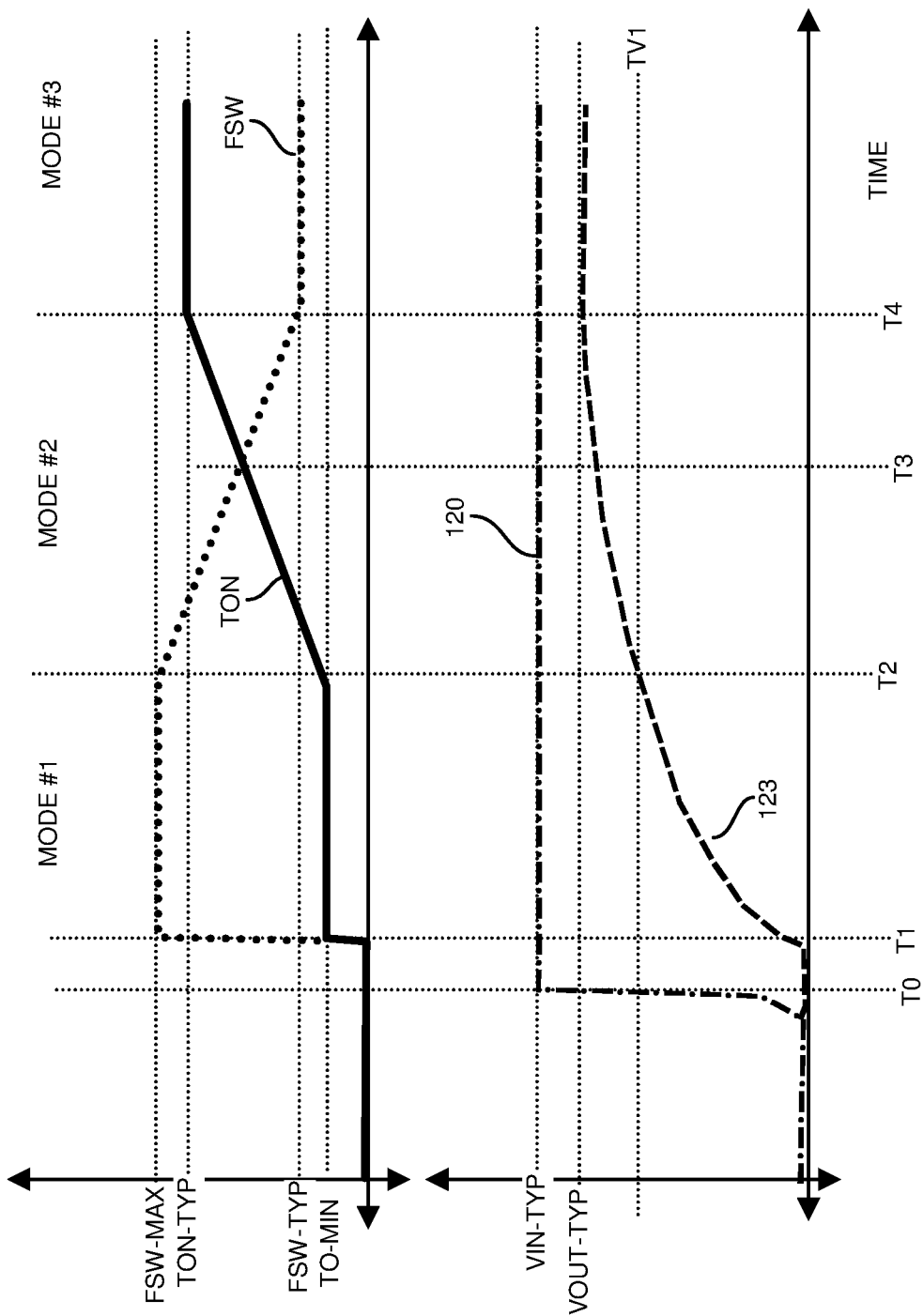
FIG. 4 is an example timing diagram illustrating multiple operational modes of a controller and corresponding switched-capacitor converter according to embodiments herein.

FIG. 4 is an example timing diagram illustrating multiple operational modes of a controller and corresponding switched-capacitor converter according to embodiments herein.

To limit in-rush of current into node 136, between time T1 and T2, the controller 140: i) sets the switching frequency FSW of control signals 105 to a fixed switching frequency value of FSW-MAX, ii) sets the ON time duration of respective switches 125 during a switching cycle to a value of TO-MIN (Time On-Minimum pulse duration).

The monitor 141 monitors a magnitude of the output voltage 123 during startup. In one nonlimiting example embodiment, when the monitor 141 detects and that a magnitude of the output voltage 123 increases above a threshold value TV1, at or around time T2, the controller 140 switches to operating in mode #2 between time T2 and time T4.

To further limit in-rush of current into node 136, in mode #2 between time T2 and T4, the controller 140 varies the switching frequency FSW of the control signals 105 from an initial value of FSW-MAX at time T2 to a target frequency value of FSW-TYP by time T4. The controller 140 varies the ON time (TON) duration of the control signals 105 from an initial value of TO-MIN at time T2 to a target TON time value of TON-TYP by time T4.

Thus, during the startup of the switched-capacitor converter 135, the controller 140: i) increases a pulse width duty cycle (via increasing an ON time of respective switches) of control signals 105 applied to the multiple switches 125, and ii) decreases a switching frequency of control signals 105 applied to the multiple switches 125.

In one embodiment, during mode #2, the controller 140 simultaneously increases the ON time of respective switches 125 and decreases the switching frequency FSW associated with the control signals 105.

In accordance with further embodiments, the controller 140 controls the multiple switches in a non-zero voltage switching mode during the startup such as between time T0 and time T4 when the output voltage 123 is below a threshold value TV1. The switched-capacitor converter 131 as described herein controls the multiple switches 125 in a zero voltage switching mode (such as in mode #3 subsequent t time T4) after the startup of the switched-capacitor converter 131.

In one embodiment, in contrast to operation in mode #3, the controller implements hard-switching of respective switches 125 during the startup mode between time T1 and time T4.

Note that, in one embodiment, a duration of the startup mode such as between T0 and T4 is proportional to a magnitude of capacitance associated with the switched-capacitor converter 131. For example, the greater the input capacitance associated with the switched-capacitor converter 131 as viewed from the input node 136, if desired, the longer the duration of operating the switched-capacitor converter 131 in the startup mode (i.e., time between T1 and T4 is longer).

In accordance with further embodiments, the selected setting of TON-MIN applied to respective control signals 105 is chosen depending on the capacitive load associated with the switched-capacitor converter 131.

Accordingly, embodiments herein include, via the controller 140, implementing multi-mode (such as including at least mode #1 and mode #2) operation of the switched-capacitor converter 131 during startup of the switched-capacitor converter 131 in which the output voltage 123 is ramped up to a target output voltage of VOUT-TYP (any suitable value). In such an instance, during startup, the controller 140 is operative to: i) in the first mode, such as during first conditions in which the output voltage 123 is detected as being below a threshold value TV1, produce control signals 105 driving the multiple switches 125, the control signals 105 being of a fixed pulse width duty cycle (fixed switch ON-time or pulse duration=TO-MIN) and fixed switching frequency (such as FSW-MAX); and ii) in the second mode, such as during second conditions in which the output voltage is detected as being above the threshold value TV1, ramp up a magnitude of the pulse width and pulse width duty cycle (switch on time, TON) of the control signals 105 driving the multiple switches 125 from TO-MIN to TON-TYP, and ramp down a magnitude of the switching frequency FSW of the control signals driving the multiple switches 125 from FSW-MAX to FSW-TYP.

As previously discussed, embodiments herein are useful over conventional techniques. For example, in contrast to conventional techniques, the novel power supply 100 as described herein reduces a respective footprint of a power supply, reduces a cost of the power supply, provides faster startup, etc.

Figure 5:
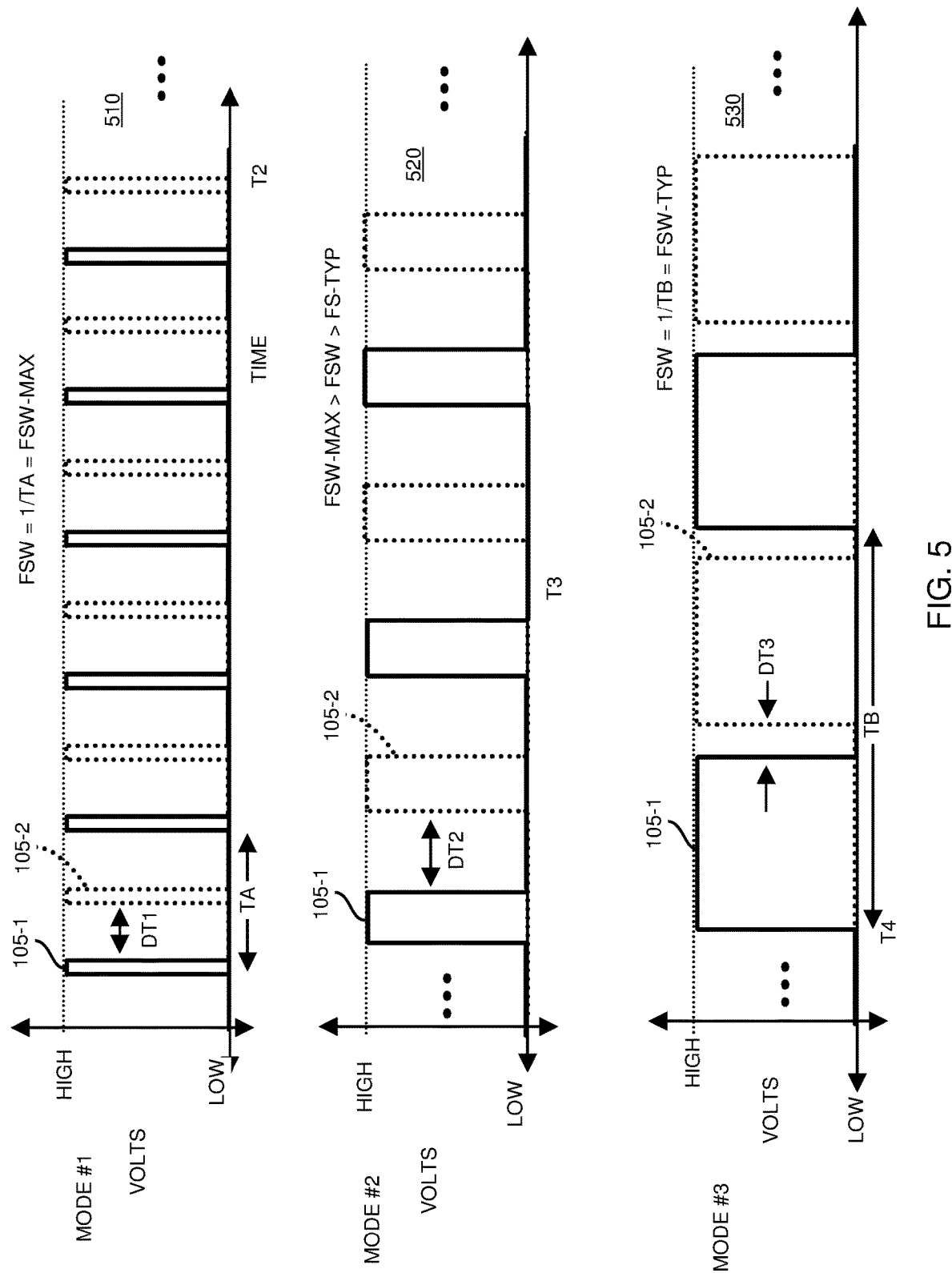
FIG. 5 is an example diagram illustrating frequency and pulse width modifications of control signals driving a switched-capacitor converter according to embodiments herein.

FIG. 5 is an example diagram illustrating frequency and pulse width modifications of control signals driving a switched-capacitor converter according to embodiments herein.

As previously discussed, and as shown in graph 510 illustrating settings of control signals 105-1 and 105-2 for mode #1 between time T1 and time T2 in graph 510, the controller 140 switches between activating first switches Q1, Q3, and Q5 (when control signal 105-1 is logic high) and activating second switches Q2, Q4, and Q6 (when control signal 105-2 is logic high) to convert the input voltage 120 into the output voltage 123. The ON-time duration of pulses associated with control signals 105 during mode #1 is substantially fixed as previously discussed. The switching frequency (FSW) associated with controls signals 105 is substantially fixed to a value such as 1/TA=FSW-MAX. DT1 represents an amount of dead time in which no switches are activated in the switched-capacitor converter 131.

For mode #2 between time T2 and time T4, as shown in graph 520, the controller 140 switches between activating first switches Q1, Q3, and Q5 (when control signal 105-1 is logic high) and activating second switches Q2, Q4, and Q6 (when control signal 105-2 is logic high) to convert the input voltage 120 into the output voltage 123. The ON-time duration of pulses during mode #2 is variable as previously discussed. For example, the switching frequency (FSW) associated with controls signals 105 varies between FSW-MAX at time T2 and FSW-TYP at time T4. DT2 represents a varying amount of dead time in which no switches are activated.

For mode #3 subsequent to time T4, as shown in graph 530, the controller 140 switches between activating first switches Q1, Q3, and Q5 (when control signal 105-1 is logic high) and activating second switches Q2, Q4, and Q6 (when control signal 105-2 is logic high) to convert the input voltage 120 into the output voltage 123. If desired, the ON-time duration of pulses associated with control signals 105 during mode #3 is substantially fixed as previously discussed. The switching frequency (FSW) associated with controls signals 105 during mode #3 is substantially fixed to a typical value such as 1/TB=FSW-TYP. DT3 represents an amount of dead time (e.g., fixed) in which no switches are activated during mode #3.

Thus, for mode #1, the dead time in which no switches are activated is DT1; for mode #2, the dead time in which no switches are activated varies; for mode #3, the dead time in which no switches are activated is DT3. As shown, the percentage of dead time for each control cycle during mode #1 is much larger compared to the percentage of dead time for each control cycle during mode #3. The percentage of dead time per cycle during mode #2 decreases between time T2 and time T3.

Figure 6:
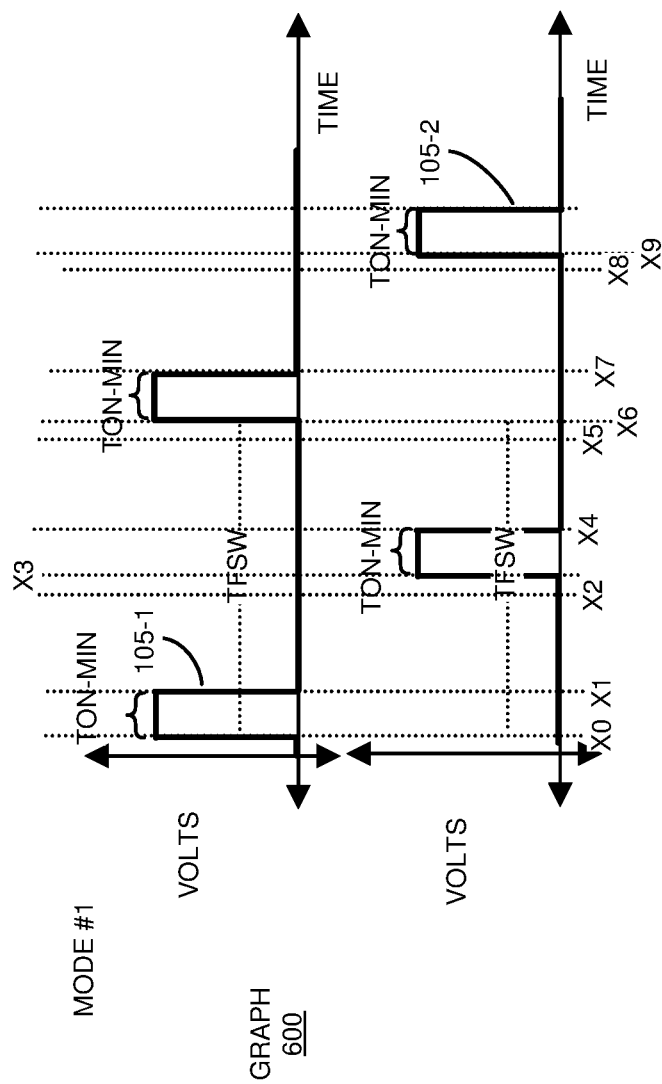
FIG. 6 is an example diagram illustrating a control signal generated in a first mode according to embodiments herein.

FIG. 6 is an example diagram illustrating a control signal generated in a first mode according to embodiments herein.

As shown in graph 600, after the input voltage 120 is detected as being above a threshold value, the controller 140 enables the soft start (i.e., V_in >V_(in,min) and V_in <V_(in,max)). In mode #1, the switching frequency FSW is at the maxium value FSW-MAX, which is defined by design, therefore is possible to define Tsw,min. As previously discussed, the switched-capacitor converter 131 presents its powering phase during the on-time of each PWM, therefore, in order to limit the energy transferred (which means less current stress) embodiments herein include implementing a selected fixed on-time TON_min.

Operation in the time intervals is as follows:

X0 to X1: Control signal 105-1 (a.k.a., PWM A) signal starts with the minimal on time to limit the inrushing current into the switched-capacitor converter 131.

X1 to X2: Control signal 105-1 (PWM A signal) is zero. This time is increasing the dead time to limit the FSW values.

X2 to X3: This represents normal dead time. The same dead time will be applied after soft start up is finished.

X3 to X4: Control signal 105-2 (a.k.a., PWM B signal) starts with the minimum on time to limit the inrushing current into the switched-capacitor converter 131.

X4 to X5: Control signal 105-2 (PWM B) signal is set to zero. This time is increasing the dead time to limit the FSW values.

X5 to X6: Normal dead time phase. The same dead time will be applied after soft start up is finished.

X6 to X7: Control signal 105-2 (PWM A signal) starts again with the minimal on time. This cycle of control and switching repeats during mode #1.

Figure 7:
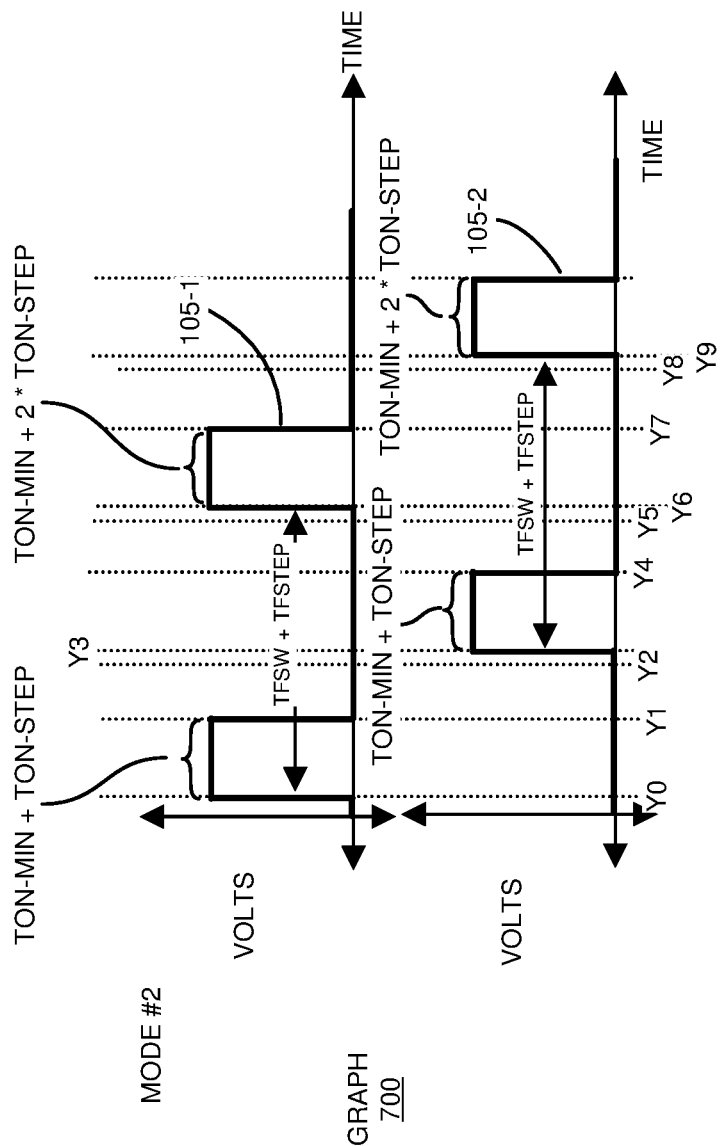
FIG. 7 is an example diagram illustrating a control signal generated in a second mode according to embodiments herein.

FIG. 7 is an example diagram illustrating a control signal generated in a second mode according to embodiments herein.

As previously discussed, mode #1 presents a fixed duration based on a design parameter (i.e., control depends on the actual equivalent capacitance of the switched-capacitor converter 131 at the input node 136 and the nominal input and output voltage). Further, as previously discussed, mode #1 represents static operation of the switches 125.

As shown in graph 700, in mode #2, the controller 140 controls switches 125 in a dynamic manner. For example, as previously discussed, the controller 140 varies T_sw (switching frequency FSW) and T_on for each cycle based on time (i.e. linear, exponential, logarithmic, etc.).

Operation in the subintervals below are as follows:

Y0 to Y1: Control signal 105-1 (PWM A signal) starts with an ON-time of the minimal on time (TON-MIN) plus the variable on-timestep (TON-STEP).

Y1 to Y2: Control signal 105-1 (PWM A signal) is zero. This time is increasing the dead time to limit the FSW realistic values. Is decreasing by ton_step and increasing tf_step.

Y2 to Y3: Normal dead time phase. The same dead time will be the same after soft start up is finished in mode #3.

Y3 to Y4: Control signal 105-2 (PWM B signal) starts with the minimum on time (TON-MIN) plus the variable on-timestep (TON-STEP).

Y4 to Y5: Control signal 105-2 (PWM B signal) is zero. This time is increasing the dead time to limit the fsw realistic values. Is decreasing by ton_step and increasing tf_step.

Y5 to Y6: Normal dead time phase. The same dead time will be also there after soft start up is finished in mode #3.

Y6 to Y7: PWM A signal starts again with the minimal on time+two times the on-timestep. This repeats each cycle until the TON and FSW reach their typical values.

In one embodiment, mode 2 is terminated in response to detecting the following conditions:

(Vin (t2))/(Vout (t_2))>TV1, where TV1=a threshold value, and when the ratio between input and output has exceed a certain threshold and at t=t2 the converters goes under nominal condition and the start-up has finished.

In one embodiment, the duration of mode #2 is t_mode2=t2−t1, although this can vary depending on the embodiment.

Figure 8:
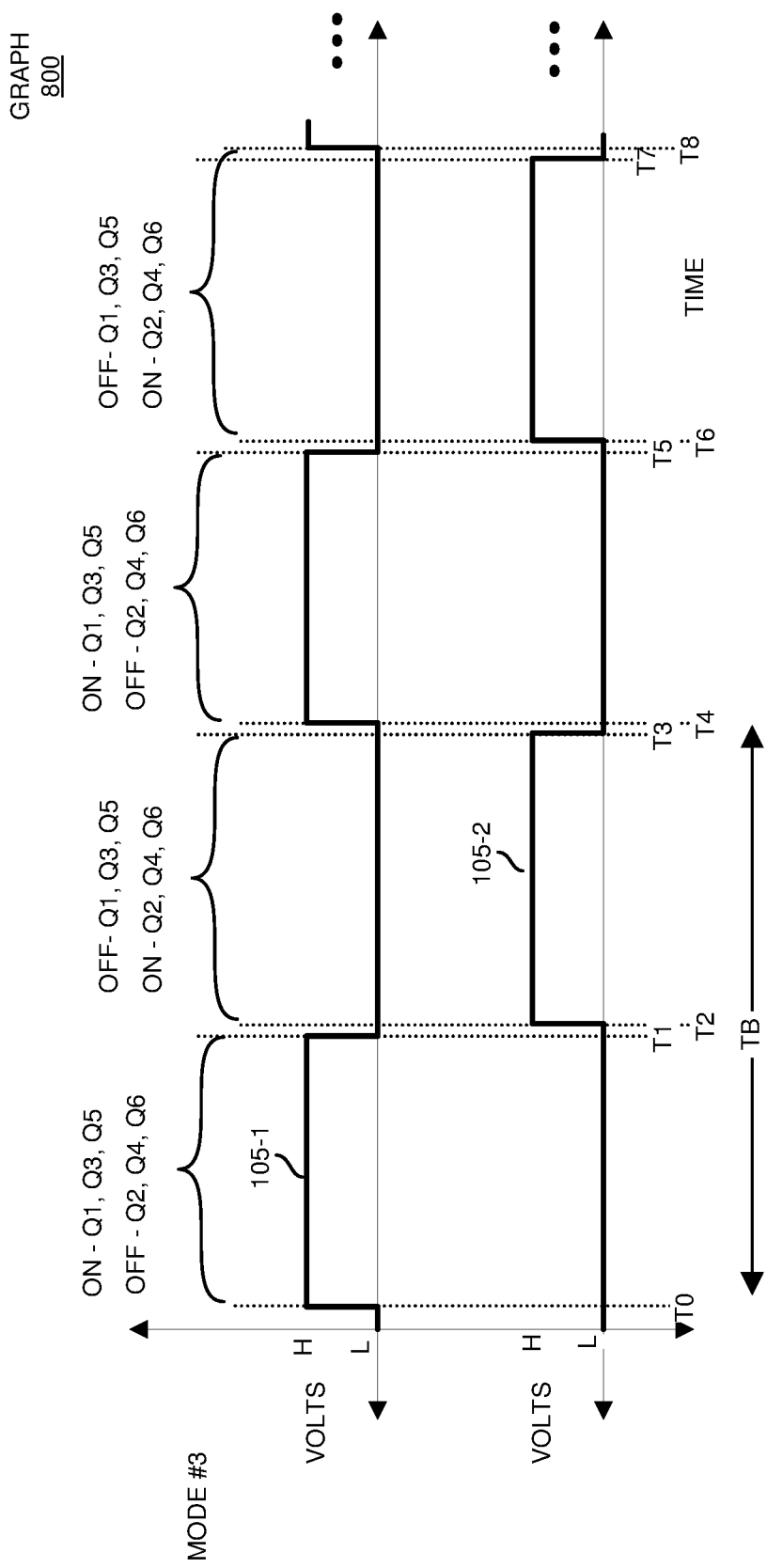
FIG. 8 is an example timing diagram illustrating timing of control signals after startup according to embodiments herein.

FIG. 8 is an example diagram illustrating generation of controls signals that control a switched-capacitor converter and a respective voltage converter according to embodiments herein.

In general, as shown in graph 800, the controller 110 produces the control signal 105-2 to be an inversion of control signal 105-1. A pulse width of each control signal is approximately 49% or other suitable pulse width modulation value.

Between time T0 and time T1, when the control signal 105-1 (at a logic high) controls the set of switches Q1, Q3, and Q5, to an ON state (low impedance or short circuit), the control signal 105-2 (logic lo) controls the set of switches Q2, Q4, and Q6, to an OFF state (very high impedance or open circuit).

Conversely, between time T2 and time T3, when the control signal 105-2 (logic high) controls the set of switches Q2, Q4, and Q6, to an ON state, the control signal 105-1 (logic low) controls the set of switches Q1, Q3, and Q5, to an OFF state.

Note that the duration between times T1 and time T2, the duration between time T3 and time T4, duration between T5 and T6, etc., represents so-called dead times during which each of the switches (Q1-Q6) in the power supply 100 is deactivated to the OFF state.

As further shown, the control signals 105 are cyclical. For example, the settings of control signals 105 for subsequent cycles is the same as those for the cycle between time T0 and time T4. More specifically, the settings of control signals 105 produced by the controller 110 between time T3 and time T7 is the same as settings of control signals 105 between time T0 and time T3, and so on.

In one embodiment, the controller 110 controls the frequency of the control signals (period is time between T0 and time T4) can be generated at any suitable frequency.

Additionally, as previously mentioned, the controller 110 controls the pulse duration of the control signals 105 to be around 49% depending on the dead-time duration, although the control signals 105 can be generated at any suitable pulse width modulation value.

A magnitude of the output voltage 123 depends on the multi-tapped autotransformer 160 turns ratio (N1/N2). The ratio between the input voltage Vin and output voltage Vout is given by the following equation:

$$Vin/Vout = 4 + [(2*N1)/N2]$$

Thus, the power converter as described herein is scalable to different conversion ratios by designing only the ratio between N1 and N2, which actually leads to claim a new family of unregulated hybrid dc-dc converter with different possible ratios Vin/Vout (such as 5 to 1, 6 to 1, 7 to 1, 8 to 1, . . . ).

Note that further embodiments herein take advantage from the leakage inductance of the multi-tapped autotransformer 160 to soft charge the capacitors Cres1 and Cres2, which act as flying capacitors, enabling use of lower voltage related MOSFETs in the primary side (primary stage 101) in comparison with conventional (classic) LLC converter topologies. Switches Q1 and Q4 block a portion of the input voltage which can be defined by the following equation:

$$Vmax(Q1,Q4) = Vin/2 + Vout*N1/N2$$

During operation, switch Q2 and switch Q5 have to block the entire input voltage Vin, while switch Q3 and Q6 have to block 2*Vout.

As previously discussed, another benefit of the power supply as described herein is its symmetric behavior, which provides a benefit that the dynamic load 118 is powered any time from the input supply Vin during each phase, reducing the current/voltage ripple on the output voltage 123.

Note further that the magnitude of the output voltage 123 (Vout) depends on the turns (# of windings N1 and N2 associated with the windings 161 and the windings 162; N1 is the turns of each winding 161 and N2 is the turns of each winding 162. In such an instance, there exists a following relation between input and output: Vin/Vout=4+[(2*N1)/N2]) and the switching frequency of the control signals 105. These can be selected to be any suitable settings. Accordingly, attributes of the switched-capacitor converter 120 can be modified to convert any input voltage level to a respective desired (such as unregulated) output voltage level.

Figure 9:
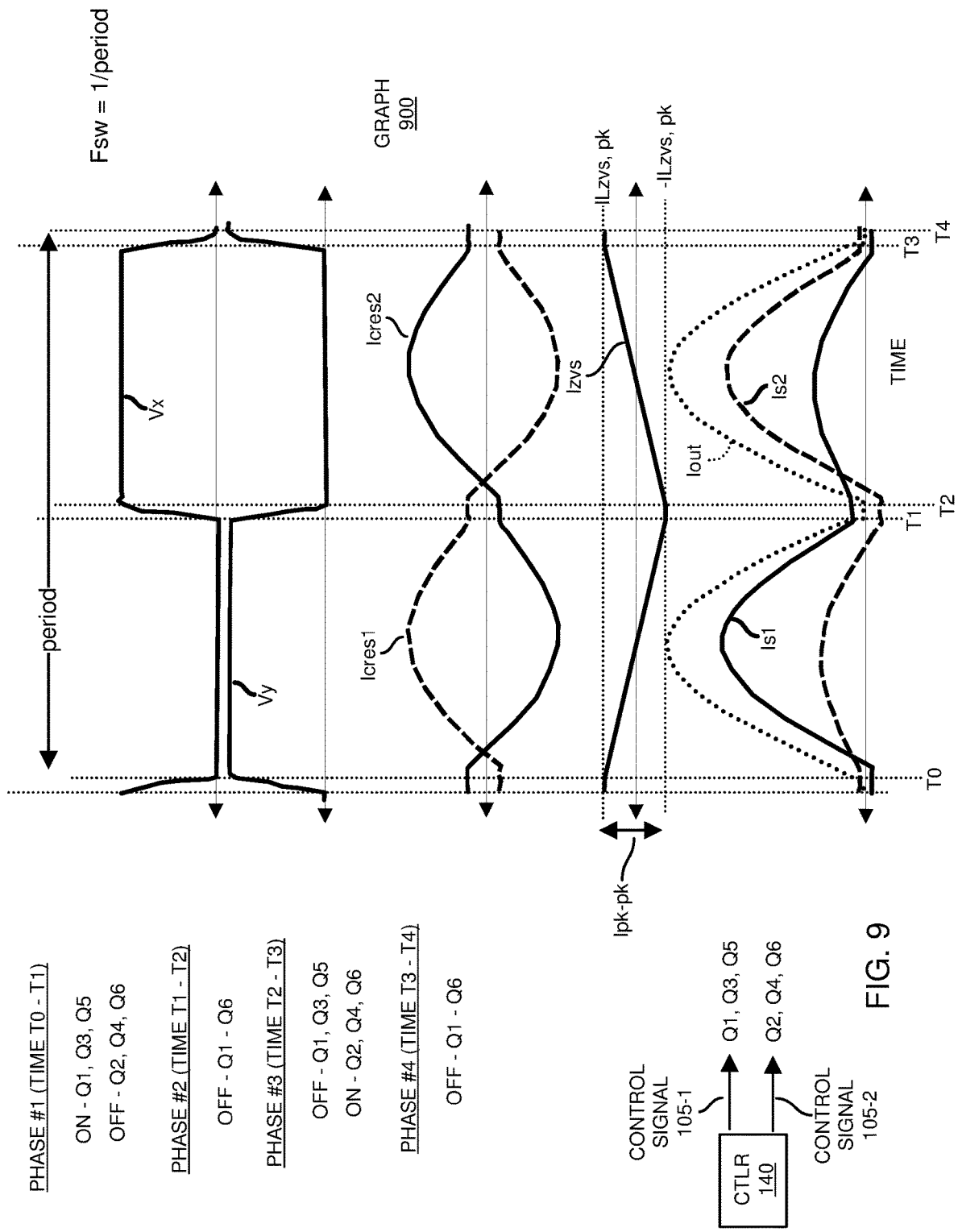
FIG. 9 is an example diagram illustrating a timing diagram of control signals and output signals after startup according to embodiments herein.

FIG. 9 is an example diagram illustrating a timing diagram of output signals according to embodiments herein.

In this example embodiment, as previously discussed, the voltage Vx indicates the voltage at node 211 between the winding 161-1 and the winding 162-1; voltage Vy indicates the voltage at node 212 of the winding 161-2 and winding 162-2.

Icres1 represents current through the series combination of capacitor Cres1 and winding 161-2; Icres2 represents current though the series combination of capacitor Cres2 and winding 161-1.

Izvs represents current through the inductor Lzvs.

Is1 represents current through the winding 162-1; Is2 represents current though the winding 162-2.

Iout (summation of current Is1 and current Is2) represents the output current (Iout) supplied by the center tap of winding 162 of the multi-tapped autotransformer 160 to a dynamic load 118. Between time T0 and time T1, when the resonant circuit path including capacitor Cres 1 and primary winding 161-2 are coupled to input voltage via activation of switch Q1, the corresponding generated current Is1 contributes a majority of the current to produce the current Iout. Conversely, between time T2 and time T3, when the resonant circuit path including capacitor Cres 2 and winding 161-1 are coupled to input voltage via activation of switch Q2, the corresponding generated current Is2 contributes a majority of the current to produce the current Iout.

Figure 10:
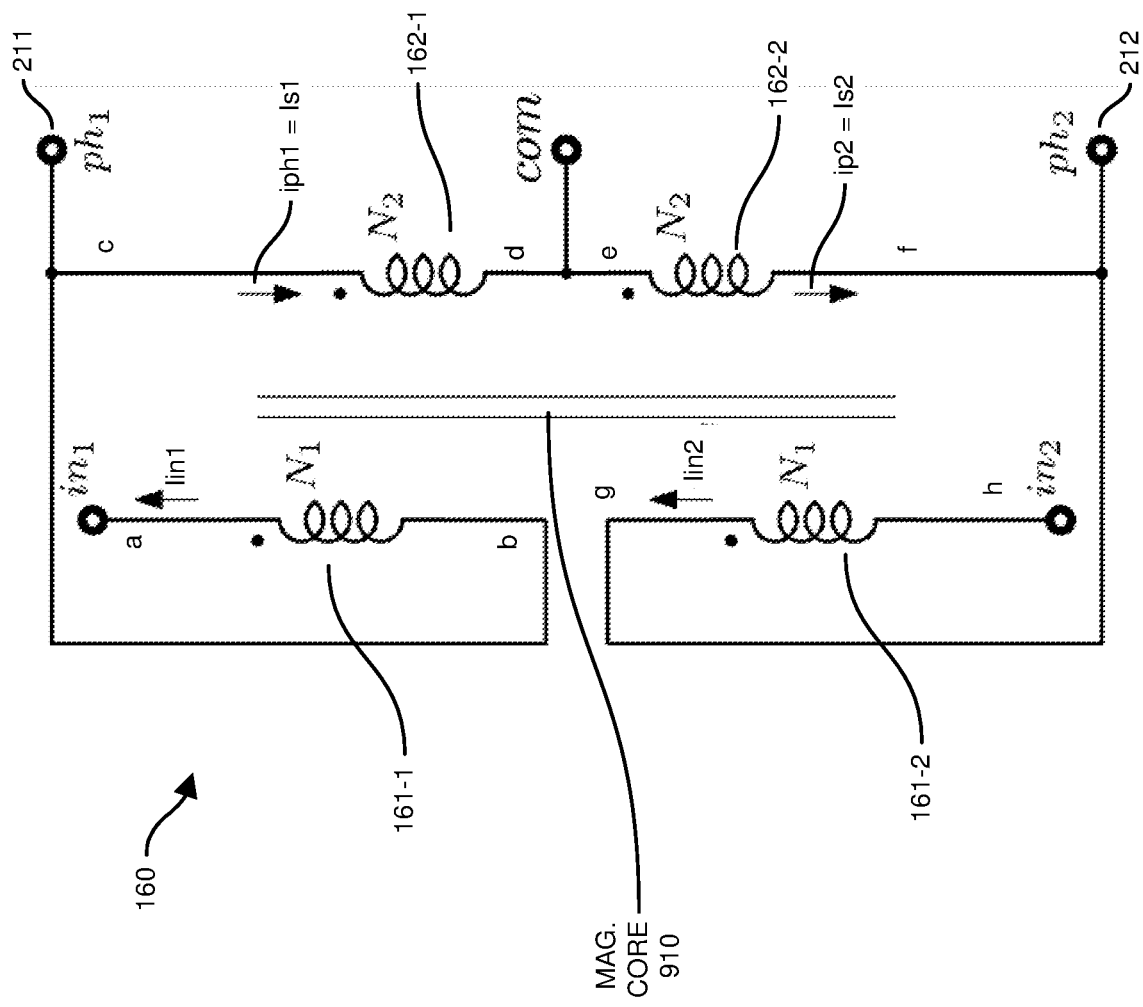
FIG. 10 is an example diagram illustrating details of a multi-tapped autotransformer according to embodiments herein.

FIG. 10 is an example diagram illustrating details of a multi-tapped autotransformer according to embodiments herein.

In one embodiment, windings of the multi-tapped autotransformer are wound on one magnetic core. The windings can be divided into two winding groups: the first group (input winding group) is formed by a combination of the winding 161-1 between node in1 and node 211 and winding 161-2 between node in2 and node 212; the second group (output winding group) is formed by a combination of the winding 162-1 between node 211 and node COM and winding 162-2 between node 212 and node COM. The input windings 161 receive energy from a switched capacitor network, while the output windings 162 are coupled to the output.

One benefit of implementing the multi-tapped autotransformer 160 in the voltage converter 135 (FIG. 2) is high efficiency and high power density, enabling use of lower voltage rating MOSFETs (such as for switches Q1-Q6) comparing with a classic LLC converter and enabling the choice of implementing Class II ceramic capacitors (such as for Cres1 and Cres2), which inherently offer high capacitance density.

Moreover, as previously discussed, the additional inductor Lzvs (alternatively implemented via the magnetizing inductance of the multi-tapped autotransformer) provides the inductive energy to ensure ZVS transition for all switches (such as MOSFETs) in the voltage converter 135.

In addition to these benefits, another benefit of the multi-tapped autotransformer 160 is the inherent lower windings losses in comparison to classic LLC converters; the overall conduction stresses for all FETs (such as switches Q1-Q6) are reduced, providing a higher reliability power.

As shown in FIG. 2 and FIG. 10, one example of a proposed multi-tapped autotransformer 160 comprises: 4 windings. All windings are arranged in series, starting from terminal node in1 (node a) and ending at terminal node in2 (node h). More specifically, a combination of winding 161-1 (between node a and node b), winding 162-1 (between node c and node d), winding 162-2 (between node e and node f), and winding 161-2 (between node g and node h) are connected in series between node in1 and node in2. Multi-tapped autotransformer 160 includes so-called taps at node in1, tap node ph1, tap node com, tap node ph2, and node in2.

The discussion below provides a further understanding associated with the magnetic structure of an embodiment of the multi-tapped autotransformer 160.

More specifically, in this example embodiment of FIG. 10, the four windings of the multi-tapped autotransformer 161 are wound on or around a common magnetic core 910, forming an multi-tapped autotransformer. As previously discussed, the windings of multi-tapped autotransformer 160 include: i) a first group of windings (any suitable number of windings) formed by the windings between node in1 and node ph1 and between node in2 and node ph2; ii) a second group of windings (any suitable number of windings) includes winding 162-1 and winding 162-2 such as between node PH1 and node PH2.

Based on this assumption, and if an ideal multi-tapped autotransformer is considered and considering that the Magneto Motive Force (MMF) is established by Is1 (a.k.a., Iph1) and Is2 (a.k.a., Iph2) at the secondary side, it must be countered by an MMF in the primary side established by Iin1 and Iin2. In this scenario the following equations are always valid:

$$N1*Iin1+N1*Iin2=N2*iph1+N2*iph2$$

Figure 11:
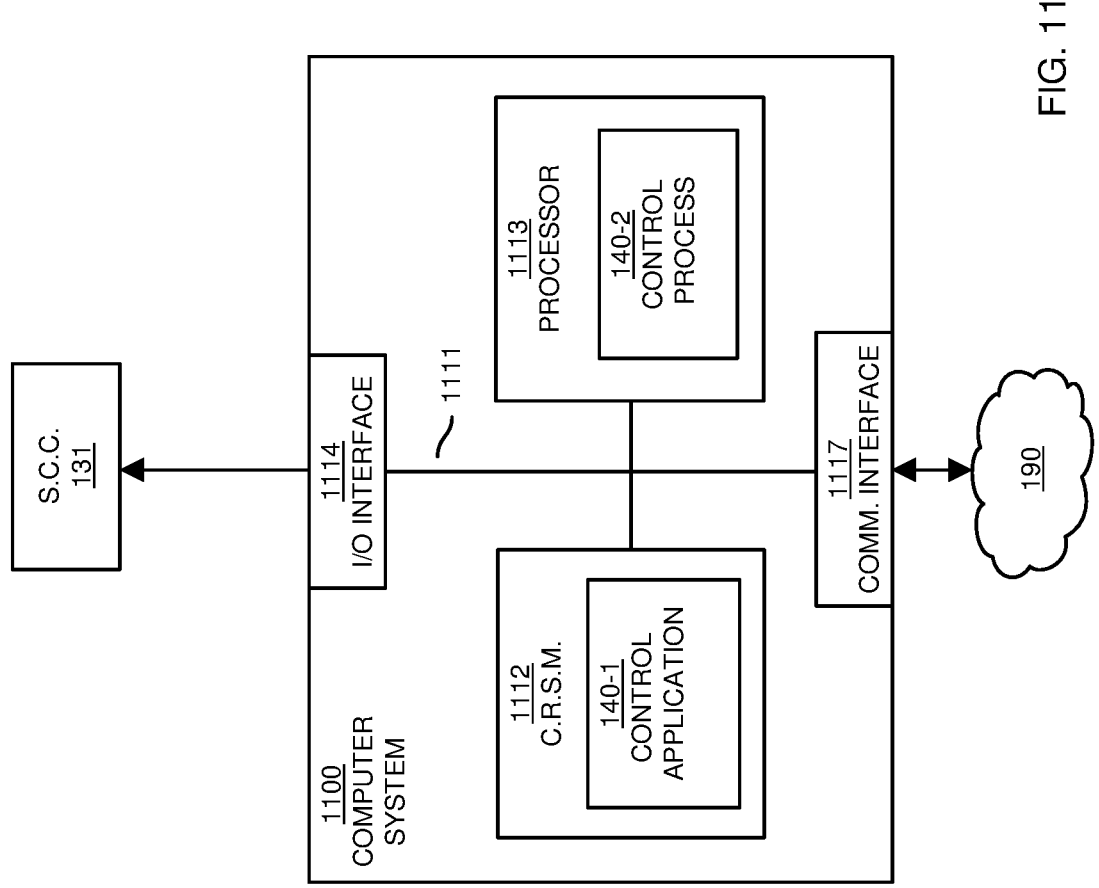
FIG. 11 is an example diagram illustrating computer processor hardware and related software instructions to execute methods according to embodiments herein.

FIG. 11 is an example block diagram of a computer device for implementing any of the operations as discussed herein according to embodiments herein.

As shown, computer system 1100 (such as implemented by any of one or more resources such as controller 140, monitor 141, etc.) of the present example includes an interconnect 1111 that couples computer readable storage media 1112 such as a non-transitory type of media (or hardware storage media) in which digital information can be stored and retrieved, a processor 1113 (e.g., computer processor hardware such as one or more processor devices), I/O interface 1114, and a communications interface 1117.

I/O interface 1114 provides connectivity to any suitable circuitry such as power converter circuit 135.

Computer readable storage medium 1112 can be any hardware storage resource or device such as memory, optical storage, hard drive, floppy disk, etc. In one embodiment, the computer readable storage medium 1112 stores instructions and/or data used by the control application 140-1 to perform any of the operations as described herein.

Further in this example embodiment, communications interface 1117 enables the computer system 1100 and processor 1113 to communicate over a resource such as network 190 to retrieve information from remote sources and communicate with other computers.

As shown, computer readable storage media 1112 is encoded with control application 140-1 (e.g., software, firmware, etc.) executed by processor 1113. Control application 140-1 can be configured to include instructions to implement any of the operations as discussed herein.

During operation of one embodiment, processor 1113 accesses computer readable storage media 1112 via the use of interconnect 1111 in order to launch, run, execute, interpret or otherwise perform the instructions in control application 140-1 stored on computer readable storage medium 1112.

Execution of the control application 140-1 produces processing functionality such as control process 140-2 in processor 1113. In other words, the control process 140-2 associated with processor 1113 represents one or more aspects of executing control application 140-1 within or upon the processor 1113 in the computer system 1100.

In accordance with different embodiments, note that computer system 1100 can be a micro-controller device, logic, hardware processor, hybrid analog/digital circuitry, etc., configured to control a power supply and perform any of the operations as described herein.

Functionality supported by the different resources will now be discussed via flowchart in FIG. 12. Note that the steps in the flowcharts below can be executed in any suitable order.

Figure 12:
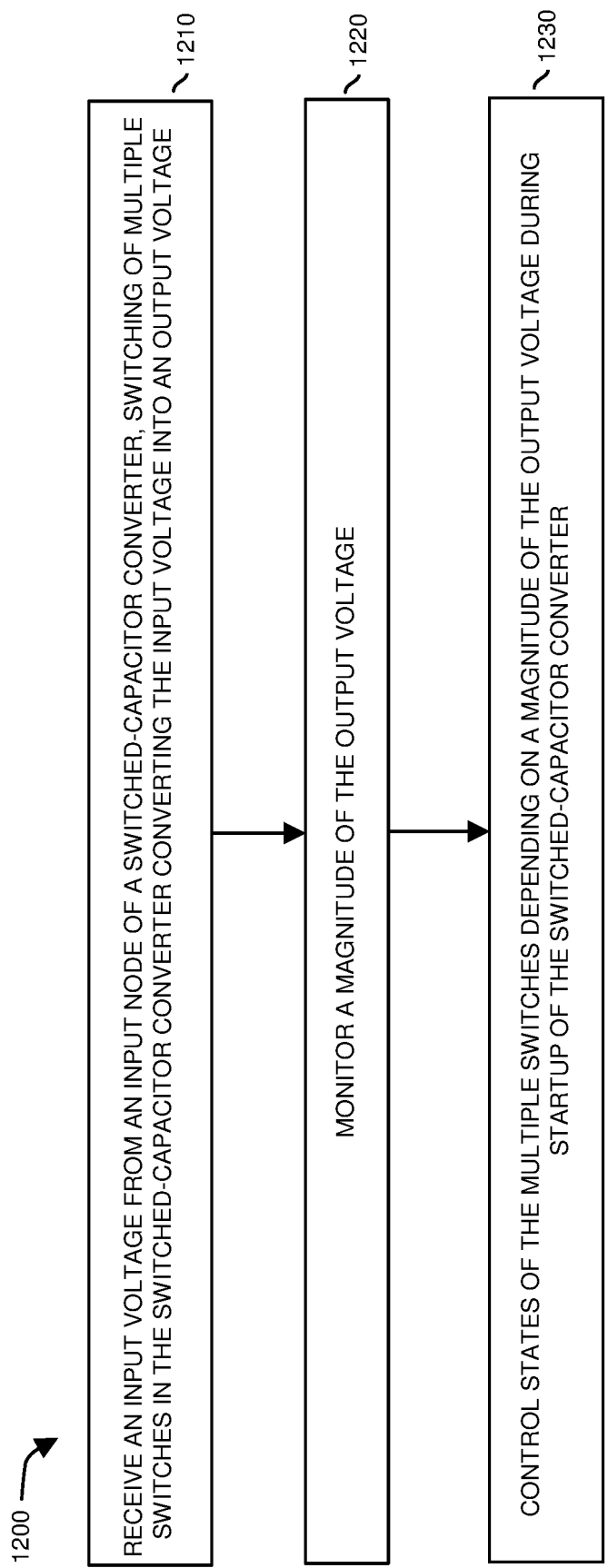
FIG. 12 is an example diagram illustrating a method according to embodiments herein.

FIG. 12 is an example diagram illustrating a method of controlling a power converter according to embodiments herein.

In processing operation 1210, the switched-capacitor converter receives an input voltage 120 from a respective input node 136. Via the controller 140, controlled switching of the multiple switches 125 (such as switches Q1-Q6) in the switched-capacitor converter 131 converts the input voltage 120 into an output voltage 123.

In processing operation 1220, the monitor 145 monitors a magnitude of the output voltage 123.

In processing operation 1230, the controller 140 controls states of the multiple switches 125 depending on a magnitude of the output voltage 123 during startup of the switched-capacitor converter 131.

Figure 13:
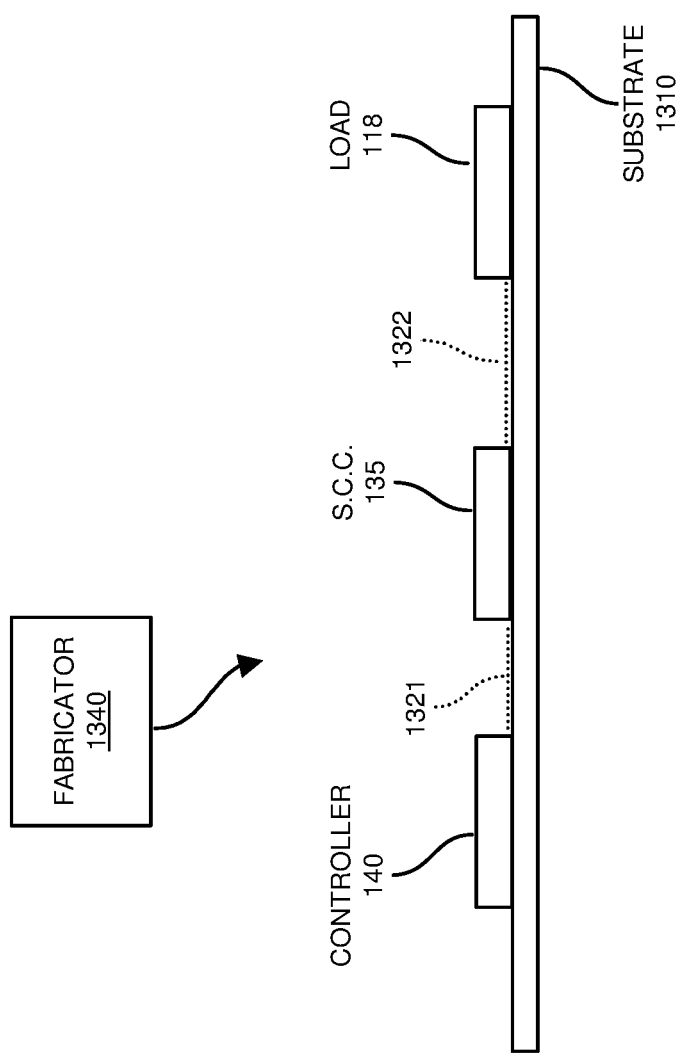
FIG. 13 is an example diagram illustrating fabrication of a circuit according to embodiments herein.

FIG. 13 is an example diagram illustrating fabrication of a power converter circuit on a circuit board according to embodiments herein.

In this example embodiment, fabricator 1340 receives a substrate 1310 (such as a circuit board or other suitable resource).

The fabricator 1340 further affixes the controller 140 and switched-capacitor converter 131 (and corresponding components) to the substrate 1310. Via circuit paths 1321 (such as one or more traces, etc.), the fabricator 1340 couples the controller 140 to the switched-capacitor converter 131.

Via one or more circuit paths 1322 (such as one or more traces, etc.), the fabricator 1340 couples the switched-capacitor converter 131 to the load 118. In one embodiment, the circuit path 1322 conveys the output voltage 123 generated from the power converter 100 to the load 118.

Accordingly, embodiments herein include a system comprising: a substrate 1310 (such as a circuit board, standalone board, mother board, standalone board destined to be coupled to a mother board, etc.); a switched-capacitor converter 131 including corresponding components as described herein; and a load 118. As previously discussed, the load 118 is powered based on conveyance of output voltage 123 and corresponding current conveyed over one or more circuit paths 1322 from the switched-capacitor converter 131 to the load 118.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1310 or disposed at a remote location.

Note again that techniques herein are well suited for use in circuit applications such as those that implement power or voltage conversion. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a switched-capacitor converter including an input node to receive an input voltage and an output node to output an output voltage, switching of multiple switches in the switched-capacitor converter converting the input voltage into the output voltage; and
a controller operative to monitor the output voltage and control states of the multiple switches to produce the output voltage depending on a magnitude of the monitored output voltage with respect to a threshold value during startup of the switched-capacitor converter;
the method further comprising:
implementing multi-mode operation of the switched-capacitor converter during the startup of the switched-capacitor converter, the implemented multi-mode operation including a first mode and a second mode in which: i) the first mode includes producing control signals driving the multiple switches, the control signals being of a fixed pulse width in response to detecting that the output voltage is below the threshold value; and ii) in the second mode, ramping up a magnitude of the pulse width of the control signals driving the multiple switches; and
wherein operation in the second mode further includes:
ramping down a magnitude of a switching frequency of the control signals driving the multiple switches.

2. The apparatus as in claim 1, wherein the controlled states of the multiple switches during the startup is operative to limit current inputted to the input node from the input voltage during the startup of the switched-capacitor converter.

3. The apparatus as in claim 2, wherein a duration of the startup and limiting of the current at the input node of the switched-capacitor converter via the input voltage is proportional to a magnitude of capacitance associated with the switched-capacitor converter.

4. The apparatus as in claim 1, wherein the controller is operative to limit current inputted to the switched-capacitor converter depending on an effective capacitance of the switched-capacitor converter from a perspective of the input node.

5. The apparatus as in claim 1, wherein the controller is operative to, during the startup of the switched-capacitor converter, increase the pulse width of control signals applied to the multiple switches, the pulse width increased from an initial value to a target value during the startup.

6. The apparatus as in claim 1, wherein the controller is operative to, during the startup of the switched-capacitor converter, decrease the switching frequency of control signals applied to the multiple switches, the switching frequency decreased from an initial switching frequency value to a target switching frequency value during the startup.

7. The apparatus as in claim 1, wherein the controller is operative to control switching of the multiple switches based on a magnitude of the input voltage and the magnitude of the output voltage.

8. The apparatus as in claim 1, wherein the controller is operative to control the multiple switches in a non-zero voltage switching mode during the startup in which the output voltage is below the threshold value; and
wherein the controller is operative to control the multiple switches in a zero voltage switching mode after the startup of the switched-capacitor converter.

9. The apparatus as in claim 1, wherein the switched-capacitor converter includes a first winding and a second winding; and
wherein the multiple switches are operable to convey energy provided from the input voltage to the first winding and the second winding.

10. The apparatus as in claim 9, wherein the switched-capacitor converter includes multiple resonant circuit paths operable to convey energy from the input voltage to the first winding and the second winding.

11. The apparatus as in claim 1, wherein the switched-capacitor converter includes:
a multi-tapped autotransformer including a first winding and a second winding, multiple capacitors of the switched-capacitor converter controllably switched in circuit paths including the first winding and the second winding; and
an output stage coupled to receive energy from a combination of the first winding and the second winding of the multi-tapped autotransformer, the output stage operable to produce the output voltage to power a load.

12. A system comprising:
a circuit substrate;
the apparatus of claim 1, the apparatus fabricated on the circuit substrate; and
a load, the load powered by the output voltage.

13. A method comprising:
receiving a circuit substrate; and
fabricating the apparatus of claim 1 on the circuit substrate.

14. The apparatus as in claim 1, wherein the controller is further operative to limit an in-rush of input current to the input node in response to detecting that the magnitude of the output voltage is less than the threshold value during the startup, the input current charging capacitors of the switched-capacitor converter.

15. The apparatus as in claim 1, wherein the controller is operative to implement the first mode of controlling the multiple switches in response to detecting that the magnitude of the output voltage is less than the threshold value; and
wherein the controller is operative to implement the second mode of controlling the multiple switches in response to detecting that the magnitude of the output voltage is greater than the threshold value.

16. The apparatus as in claim 15, wherein implementation of the first mode includes limiting an in-rush of input current from the input voltage charging capacitors of the switched-capacitor converter.

17. The apparatus as in claim 1, wherein the controller is further operative to monitor a magnitude of the input voltage and delay switching of the multiple switches depending on a magnitude of the input voltage with respect to an input voltage threshold level.

18. The apparatus as in claim 1, wherein the controller is further operative to limit an in-rush of input current to the input node, the in-rush of input current operative to charge capacitors of the switched-capacitor converter, the controller operative to limit the in-rush of input current with respect to an input current threshold level during at least a portion of the startup of ramping the magnitude of the output voltage from an initial voltage to a target voltage.

19. An apparatus comprising:
a switched-capacitor converter including an input node to receive an input voltage and an output node to output an output voltage, switching of multiple switches in the switched-capacitor converter converting the input voltage into the output voltage; and
a controller operative to monitor the output voltage and control states of the multiple switches to produce the output voltage depending on a magnitude of the monitored output voltage with respect to a threshold value during startup of the switched-capacitor converter;
wherein the controller is further operative to implement multi-mode operation of the switched-capacitor converter during the startup of the switched-capacitor converter in which the output voltage is ramped to a target output voltage, the multi-mode operation including a first mode and a second mode;
wherein the controller is operative to:
i) in the first mode, during first conditions in which the output voltage is detected as being below the threshold value, produce first control signals driving the multiple switches, the first control signals being of a fixed pulse width and fixed switching frequency; and
ii) in the second mode, during second conditions in which the output voltage is detected as being above the threshold value, ramp up a magnitude of the pulse width of second control signals driving the multiple switches, and ramp down a magnitude of a switching frequency of the second control signals driving the multiple switches.

20. The apparatus as in claim 1, wherein the controller is operative to control the multiple switches depending on a magnitude of input current to the input node with respect to an input current threshold level during the startup.

21. The apparatus as in claim 1, wherein the threshold value is less than a target magnitude of the output voltage reached after completion of the startup of the switched-capacitor converter.

22. A method comprising:
receiving an input voltage from an input node of a switched-capacitor converter, switching of multiple switches in the switched-capacitor converter converting the input voltage into an output voltage;
monitoring a magnitude of the output voltage; and
controlling states of the multiple switches depending on a magnitude of the output voltage with respect to a threshold value during startup of the switched-capacitor converter;
the method further comprising:
implementing multi-mode operation of the switched-capacitor converter during the startup of the switched-capacitor converter in which the output voltage is ramped to a target output voltage, the implemented multi-mode operation including a first mode and a second mode in which: i) the first mode includes producing first control signals driving the multiple switches, the first control signals being of a fixed pulse width and fixed switching frequency in response to detecting that the output voltage is below the threshold value; and ii) in the second mode, ramping up a magnitude of the pulse width of second control signals driving the multiple switches, and ramping down a magnitude of the switching frequency of the second control signals driving the multiple switches.

23. The method as in claim 22, wherein controlling the states of the multiple switches depending on the magnitude of the output voltage during the startup of the switched-capacitor converter includes:
limiting current inputted to the input node from the input voltage during the startup of the switched-capacitor converter.

24. The method as in claim 22, wherein an amount of current inputted from the input voltage to the input node to the switched-capacitor converter during the startup depends on a capacitance associated with the switched-capacitor converter.

25. The method as in claim 22 further comprising:
ramping pulse widths of control signals applied to the multiple switches during the startup of the switched-capacitor converter.

26. The method as in claim 22 further comprising:
during the startup of the switched-capacitor converter, increasing the pulse width of control signals applied to the multiple switches, the pulse width increased from an initial value to a target value during the startup.

27. The system as in claim 22 further comprising:
during the startup of the switched-capacitor converter, decreasing the switching frequency of the second control signals applied to the multiple switches, the switching frequency decreased from an initial switching frequency value to a target switching frequency value during the startup.

28. The method as in claim 22 further comprising:
operating the multiple switches in a non-zero voltage switching mode during the startup in which the output voltage is below the threshold value; and
operating the multiple switches in a zero voltage switching mode after the startup of the switched-capacitor converter.

29. The method as in claim 22, wherein a duration of the startup and limiting current supplied to the switched-capacitor converter via the input voltage is proportional to a magnitude of capacitance associated with the switched-capacitor converter.

30. An apparatus comprising: a switched-capacitor converter including an input node to receive an input voltage and an output node to output an output voltage, switching of multiple switches in the switched-capacitor converter converting the input voltage into the output voltage: a controller operative to monitor the output voltage and control states of the multiple switches to produce the output voltage depending on a magnitude of the monitored output voltage with respect to a threshold value during startup of the switched-capacitor converter; wherein the threshold value is less than a target magnitude of the output voltage reached after completion of the startup of the switched-capacitor converter: and wherein the controller is operative to, responsive to a condition in which the magnitude of the monitored output voltage is less than the threshold value while continuously ramping up of the magnitude of the output voltage from an initial magnitude to the target magnitude, control the multiple switches to limit a magnitude of input current to the input node with respect to an input current threshold level; therein tie initial magnitude is less titan the threshold value.

* * * * *

UNITED STATES PATENT AND TRADEMARK OFFICE
CERTIFICATE OF CORRECTION

PATENT NO. : 11,502,597 B2
APPLICATION NO. : 16/737134
DATED : November 15, 2022
INVENTOR(S) : Christian Rainer and Roberto Rizzolatti It is certified that error appears in the above-identified patent and that said Letters Patent is hereby corrected as shown below:

In the Claims

Column 24, Claim 30, Line 20, replace "therein tie" with --wherein the--

Column 24, Claim 30, Line 20, replace "titan" with --than--

Signed and Sealed this
Seventeenth Day of January, 2023

Katherine Kelly Vidal
*Director of the United States Patent and Trademark Office*